United States Patent
Agarwal et al.

(10) Patent No.: US 11,729,058 B1
(45) Date of Patent: Aug. 15, 2023

(54) COMPUTER-BASED MULTI-CLOUD ENVIRONMENT MANAGEMENT

(71) Applicant: International Business Machines Corporation, Armonk, NY (US)

(72) Inventors: Noopur Agarwal, Agra (IN); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/934,933

(22) Filed: Sep. 23, 2022

(51) Int. Cl.
   *H04L 41/08* (2022.01)
   *H04L 41/16* (2022.01)
   *H04L 41/22* (2022.01)
   *H04L 67/10* (2022.01)

(52) U.S. Cl.
   CPC ......... *H04L 41/0883* (2013.01); *H04L 41/16* (2013.01); *H04L 41/22* (2013.01); *H04L 67/10* (2013.01)

(58) Field of Classification Search
   CPC ..... H04L 41/0883; H04L 41/16; H04L 41/22; H04L 67/10
   See application file for complete search history.

(56) References Cited

U.S. PATENT DOCUMENTS

| | | | |
|---|---|---|---|
| 5,704,012 A | 12/1997 | Bigus | |
| 7,308,687 B2 | 12/2007 | Trossman | |
| 8,046,468 B2 | 10/2011 | Isci | |
| 10,778,597 B1 * | 9/2020 | Tan | H04L 67/02 |
| 11,372,689 B1 * | 6/2022 | Allen | G06F 9/4887 |
| 2006/0092851 A1 | 5/2006 | Edlund | |
| 2006/0218278 A1 | 9/2006 | Uyama | |
| 2015/0263980 A1 * | 9/2015 | Kasturi | H04L 41/5019 709/226 |
| 2018/0027006 A1 * | 1/2018 | Zimmermann | G06F 21/6218 726/11 |
| 2020/0167199 A1 | 5/2020 | Zur | |
| 2020/0394072 A1 * | 12/2020 | Sreekantaswamy | G06F 11/0793 |

(Continued)

OTHER PUBLICATIONS

Al-Asaly, et al., "A deep learning-based resource usage prediction model for resource provisioning in an autonomic cloud computing environment", Neural Computing and Applications, Issue 34, Article 13, Jul. 2022, 20 pages, <https://www.researchgate.net/publication/356145977>.

(Continued)

*Primary Examiner* — El Hadji M Sall
(74) *Attorney, Agent, or Firm* — Joseph P. Curcuru (57) ABSTRACT

In an approach to improve the management of multi-cloud environment resources embodiments of the present invention execute provisioning and rerouting mechanisms to maintain continuity in the multi-cloud computing environment despite changes to one or more predetermined factors or an identified problem. Additionally, embodiments predict a future need of a system based on collected data and the executed provision and rerouting mechanisms and analyze use history within the multi-cloud computing environment. Moreover, embodiments identify one or more solutions to address the future needs of the system based on the analysis of the use history; and proactively and autonomously implement the one or more identified solutions based one or more predetermined criteria in the multi-cloud computing environment.

20 Claims, 3 Drawing Sheets

(56) References Cited

U.S. PATENT DOCUMENTS

2021/0111980 A1* 4/2021 Gupta .................. H04L 41/147
2022/0365835 A1* 11/2022 Kandasamy ........ G06F 11/0709

OTHER PUBLICATIONS

Amazon Web Services, "Amazon EC2 Auto Scaling", last retrieved from the internet Jun. 8, 2022, 8 pages, <https://aws.amazon.com/ec2/autoscaling/>.

Ardagna, et al., "Multi-timescale Distributed Capacity Allocation and Load Redirect Algorithms for Cloud System", Report No. 2011.23, Draft Oct. 25, 2011, 31 pages, <https://citeseerx.ist.psu.edu/viewdoc/download?doi=10.1.1.474.5348&rep=rep1&type=pdf>.

Bankole, et al., "Predicting Cloud Resource Provisioning using Machine Learning Techniques", 26th IEEE Canadian Conference Of Electrical And Computer Engineering (CCECE), 2013, 4 pages, <https://ieeexplore.ieee.org/document/6567848>.

Disclosed Anonymously, "Calendar-Aware Predictive Machine Learning Based Elasticity for Cloud Load Balancers", An IP.com Prior Art Database Technical Disclosure, IP.com No. IPCOM000268544D, IP.com Electronic Publication Date: Feb. 4, 2022, 4 pages, <https://priorart.ip.com/IPCOM/000268544>.

Disclosed Anonymously, "Method for transitioning workload on servers with predicted failures", An IP.com Prior Art Database Technical Disclosure, Original Publication Date: Oct. 22, 2004, IP.com No. IPCOM000032072D, IP.com Electronic Publication Date: Oct. 22, 2004, 3 pages, <https://priorart.ip.com/IPCOM/000032072>.

Disclosed Anonymously, "Smart Cloud Optimizer", An IP.com Prior Art Database Technical Disclosure, IP.com No. IPCOM000262906D, IP.com Electronic Publication Date: Jul. 13, 2020, 4 pages, https://priorart.ip.com/IPCOM/000262906>.

Fang, et al., "RPPS: A Novel Resource Prediction and Provisioning Scheme in Cloud Data Center", 2012 IEEE Ninth International Conference on Services Computing, 2012, pp. 609-616, https://ieeexplore.ieee.org/document/6274197>.

Islam, et al., "Empirical prediction models for adaptive resource provisioning in the cloud", Future Generation Computer Systems, vol. 28, Issue 1, Jan. 2012, pp. 155-162, <https://dl.acm.org/doi/10.1016/j.future.2011.05.027>.

Liu, et al., "Load Balancing Oriented Predictive Routing Algorithm for Data Center Networks", Future Internet, vol. 13, Issue 2, Article 54, Feb. 2021, 13 pages, <https://www.researchgate.net/publication/349512702>.

Moreno-Vozmediano, et al., "Efficient resource provisioning for elastic Cloud services based on machine learning techniques", Journal of Cloud Computing: Advances, Systems and Applications, Issue 8, Article Nos. Apr. 16, 2019, 18 pages, <https://journalofcloudcomputing.springeropen.com/articles/10.1186/s13677-019-0128-9>.

Nikravesh, et al, "An autonomic prediction suite for cloud resource provisioning", Journal of Cloud Computing, vol. 6, Article No. 3, Feb. 3, 2017, 20 pages, <https://journalofcloudcomputing.springeropen.com/articles/10.1186/s13677-017-0073-4>.

Velayutham, et al., "A Prediction based Cloud Resource Provisioning using SVM", Recent Advances in Computer Science and Communications (Formerly: Recent Patents on Computer Science), vol. 13, No. 3, 2020, pp. 531-535, Abstract only, <https://www.researchgate.net/publication/339086102_A_Prediction_based_Cloud_Resource_Provisioning_using_SVM>.

* cited by examiner

COMPUTER-BASED MULTI-CLOUD ENVIRONMENT MANAGEMENT

BACKGROUND OF THE INVENTION

The present invention relates generally to multi-cloud environments, and more particularly to the field of improving the management of multi-cloud environment resources.

Multi-cloud is the use of cloud services from more than one cloud vendor. It can be as simple as using software-as-a-service (SaaS) from different cloud vendors—e.g., Salesforce and Workday. But in the enterprise, multi-cloud typically refers to running enterprise applications on platform-as-a-service (PaaS) or infrastructure-as-a-service (IaaS) from multiple cloud service providers. A multi-cloud solution is a cloud computing solution that's portable across multiple cloud providers' cloud infrastructures. Multi-cloud solutions are typically built on open-source, cloud-native technologies, such as Kubernetes, that are supported by all public cloud providers. They also typically include capabilities for managing workloads across multiple clouds with a central console (or 'single pane of glass'). Many of the leading cloud providers, as well as cloud solution providers such as VMware, offer multi-cloud solutions for compute infrastructure, development, data warehousing, cloud storage, artificial intelligence (AI) and machine learning (ML), disaster recovery/business continuity and more.

The key to maximizing the benefits of a multi-cloud architecture is to manage applications and resources across the multiple clouds centrally, as if they were part of a single cloud. But multi-cloud management comes with multiple challenges including: (i) maintaining consistent cloud security and compliance policies across multiple platforms; (ii) consistently deploying applications across target environments (e.g., development, staging, and production) and various hosting platforms; and (iii) federating and visualizing events from logging and monitoring tools to achieve a singular view and configure consistent responses. Organizations use multi-cloud management tools—or preferably, a multi-cloud management platform—to monitor and manage their multi-cloud deployments as if they were a single cloud environment.

SUMMARY

Embodiments of the present invention disclose a computer-implemented method, a computer program product, and a system, for managing resources in a multi-cloud computing environment, the computer-implemented method comprising: executing provisioning and rerouting mechanisms to maintain continuity in the multi-cloud computing environment despite changes to one or more predetermined factors or an identified problem; predicting a future need of a system based on collected data and the executed provision and rerouting mechanisms; analyzing use history within the multi-cloud computing environment; identifying one or more solutions to address the future needs of the system based on the analysis of the use history; and proactively and autonomously implementing the one or more identified solutions based one or more predetermined criteria in the multi-cloud computing environment.

DETAILED DESCRIPTION

Embodiments of the present invention recognize that cloud customers face multiple challenges as they are moving their workloads to cloud and leveraging cloud-based services. Generally, the challenges revolve around business continuity. Embodiments of the present invention recognize that business continuity can be impacted by several factors including service reliability, environmental changes such as datacenter temperature, weather impact (e.g., hurricane or severe storms), security and vulnerability, and business demands. Further, embodiments of the present invention recognize that an issue for cloud customers is the difficulty of monitoring a plurality predetermined metrics and the difficulty to react in a timely manner to ensure the continuity of the business.

Embodiments of the present invention solve at least the problems and/or issues stated above by auto provisioning and/or rerouting one or more mechanisms to address business continuity in event of changes in business, environment, weather, computing power, infrastructure, security breaches and other key factors. Additionally, embodiments of the present invention solve at least the problems and/or issues stated above by utilizing an artificial intelligence (AI) infused algorithm to monitor and analyze use history and data science techniques to identify and select an optimized path to predict service failures and apply auto correction. Embodiments of the present invention may identify and select an optimized path through machine learning techniques, wherein the selected optimized route results in a stable route. Based on root cause of the prediction, the auto correction may lead to reroute the traffic to backup software as a service (SaaS) or the auto correction may lead to an auto provision of a component of the SaaS. Additionally, embodiments of the present invention solve at least the problems and/or issues stated above by utilizing one or more AI based provisioning and rerouting mechanisms to sustain one or more problems like business changes, compute changes, infrastructure (infra) changes, increase or decrease in demand and/or other business key matrix factors, wherein embodiments do not simply analyze and predict the future needs but also deploy additional resources (clusters etc.) on predetermined environments beforehand to fulfil the identified future needs, wherein AI infused algorithm will monitor and analyze use history or any other data science techniques to select an optimize way of addressing the identified future needs. Embodiments of the present invention may (i) provision one or more resources (based on the analysis) some time before the need so as to remedy or prevent one or more forthcoming challenges, (ii) automate the rerouting of traffic based on machine learning AI with data from sources (e.g., traffic, computing power, environment, weather, and security), and (iii) auto-provision one or more components of an (e.g., SaaS) based on machine learning AI with data from sources Traffic, compute, environment, weather, security.

Figure 1:
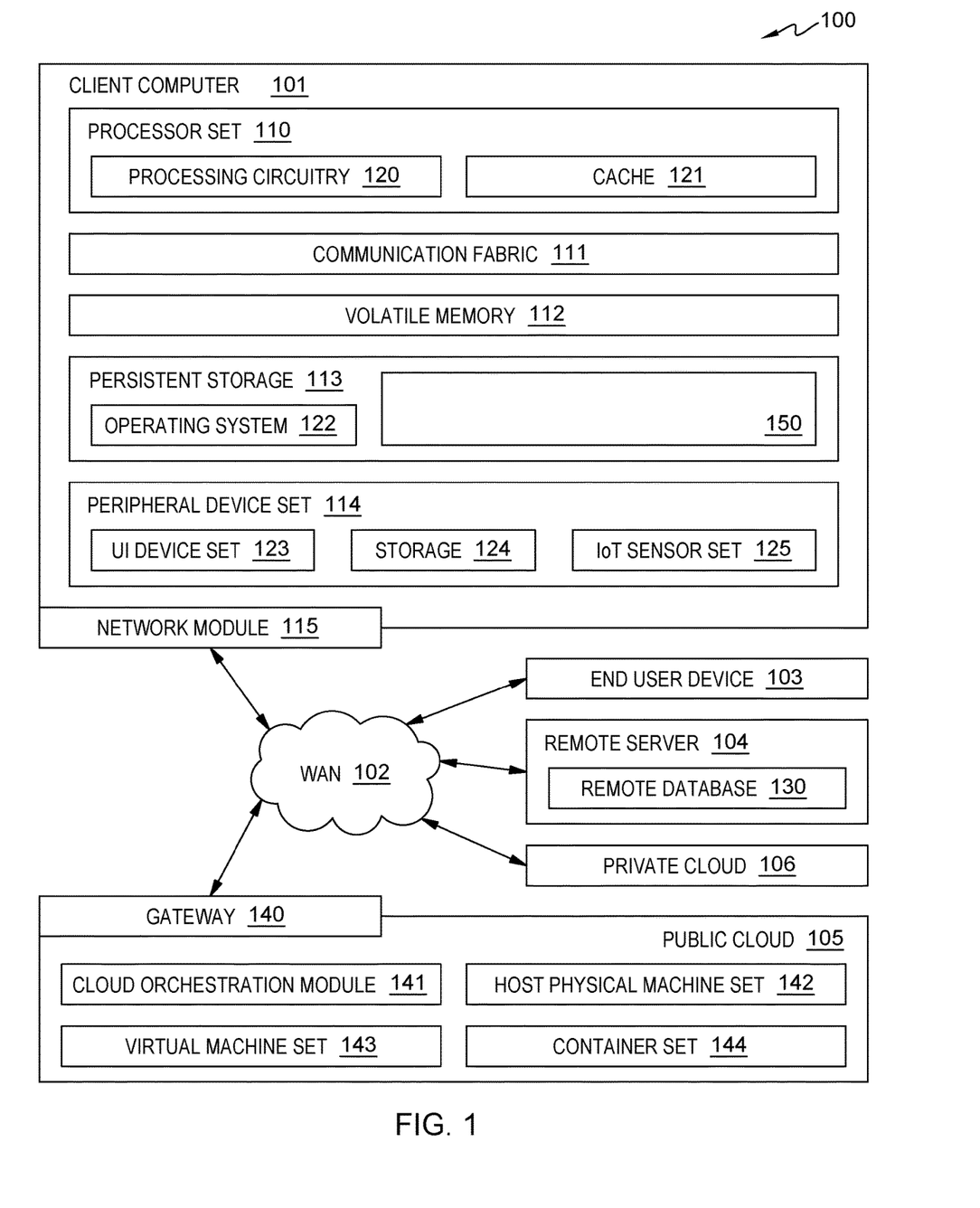
FIG. 1 is a functional block diagram illustrating a distributed data processing environment, executing a multi-cloud environment management program, in accordance with an embodiment of the present invention.

Implementation of embodiments of the invention may take a variety of forms, and exemplary implementation details are discussed subsequently with reference to the Figures (i.e., FIG. 1-FIG. 3).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as multi-cloud environment management program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may continuously depict the future needs of a predetermined system and may propose one or more proactive actions to prevent the identified future need (e.g., a predicted system failure) rather than proposing remedying actions post-failure. Thus, component 150 improves the art at least by enabling a healthier system, reducing maintenance cost during the course of time, enabling efficient usage and sustainability for the increased loads, enabling AI based re-routing to avoid outages which make the systems highly available, reducing breakdowns and downtime, and enabling optimal resource allocation as per the incoming needs.

Component 150 may predict the future needs, problems, failures, resource crunches, and/or any other sudden issues, collectively referred to as system issues, and provide one or more solutions to the identified/predicted system issues prior to the occurrences of said system issues. In some embodiments, component 150 may not always auto-scaling but may generate and display responsive prompts to an end user, wherein the scaling is responsive to the issued responsive prompt. Component 150 may utilize workload/container distribution across hosts, and/or minimize the CPU/memory usage for the daemon processes or lesser operating system (OS) interruptions, a pod restart, or node addition, wherein component 150 may predict and solve an identified system issue before the identified system issue(s) actually occur. Component 150 may not be limited to predicting and provisioning. The predictions are done on the basis of various factors not just the resource utilization (e.g., the number of users logging in, the amount of data fed to the systems, or during the peaks or fall usage dates). The demand may be fulfilled based on the prediction via provisioning additional infra or just shifting the container workload, or replicating the over-utilized resources, or performing cleanup of under-utilized container/workloads. In various embodiments, component 150 utilizes beforehand learning to actively learn the pattern consistently so that there is no delay or downtime during execution.

Component 150 may determine if the same level of activity is needed for business continuity, if there is a need of an extra database replicated schema or a new container to hold the level of activity, increase the load, or if there is an existing container load shifting to another cluster. In various embodiments, component 150 provisions the cluster and then shifts the applications, not just provisioning. Component 150 may reroute traffic and auto-provision components based on predictions through machine-based learning and AI. In various embodiments, component 150 executes an automated rerouting of traffic based on machine learning AI with data from sources, wherein sources comprise, but are not limited to, traffic, compute, environment, weather, and/or security. Cloud exit may be triggered by the predictions based on weather data, security breach or environmental data. In various embodiments, component 150 executes a provisioning of components of a SaaS based on machine learning AI with data from sources Traffic, compute, environment, weather, and/or security. Services do plan for auto-scaling of components of a SaaS; however, component 150 performs an auto-provision of components based on trusted prediction driven by data coming from traffic, compute, environment, weather, security. For example, consider an SaaS service is leveraging a database. Component 150 suggests ingesting metrics into the AI/ML pipeline to generate a trusted prediction, and automatically provision database from another provider and configure the database to be used by the SaaS service. An example of prediction could be based on the analysis of security data predicting breach or unacceptable response time based on service response time analysis. Component 150 may provision one or more resources, based on an analysis of the use history within the multi-cloud computing environment, for a predetermined time prior to the implementation so as to address one or more forthcoming challenges associated with the future need of the system.

Component 150 may collect data, via AI and ML techniques feature engineering, SelectKBest, and Regularize, to make the data more concrete to get the correct or near to correct predictions, wherein correct or near correct predictions are based on a predetermined threshold or range. Component 150 may enable a multi-cloud system to prepare itself to process one or more of the curated sets of automated instruction and prepare to process the predicted solution. Component 150, via the ML predictions and processing, may predict whether rerouting is required, wherein if rerouting is required then component 150 may instruct, alert, and/or orchestrate the multi-cloud system to prepare itself to re-route the traffic to failover region based on ML and route the traffic to failover region based on ML. For example, in the SaaS world, there is always a backup region setup. So, component 150 use the analysis to start rerouting traffic to backup/failover setup. In various embodiments, component 150 Reroutes the traffic of a multi-cloud environment (i.e., system), and auto-provisions components of the system based on generated predictions through machine-based learning and AI. The AI infused mechanism/algorithm may be used to identify and generate the corrective action based on the key matrix and taking the appropriate action.

In some embodiments, component 150 executes provisioning and rerouting mechanisms to maintain continuity in the multi-cloud computing environment despite changes to one or more predetermined factors or an identified problem, wherein provisioning and rerouting mechanisms further comprises: predicting a future need of a system based on collected data and the executed provision and rerouting mechanisms, analyzing use history within the multi-cloud computing environment, identifying one or more solutions to address the future needs of the system based on the analysis of the use history, provisioning one or more resources, based on an analysis of the use history within the multi-cloud computing environment, for a predetermined time prior to the implementation so as to address one or more forthcoming challenges associated with the future need of the system, re-routing a provisioned artefact and the collected data to a newly provisioned cluster in a safe zone, and/or proactively and autonomously implementing the one or more identified solutions based one or more predetermined criteria in the multi-cloud computing environment.

Figure 2:
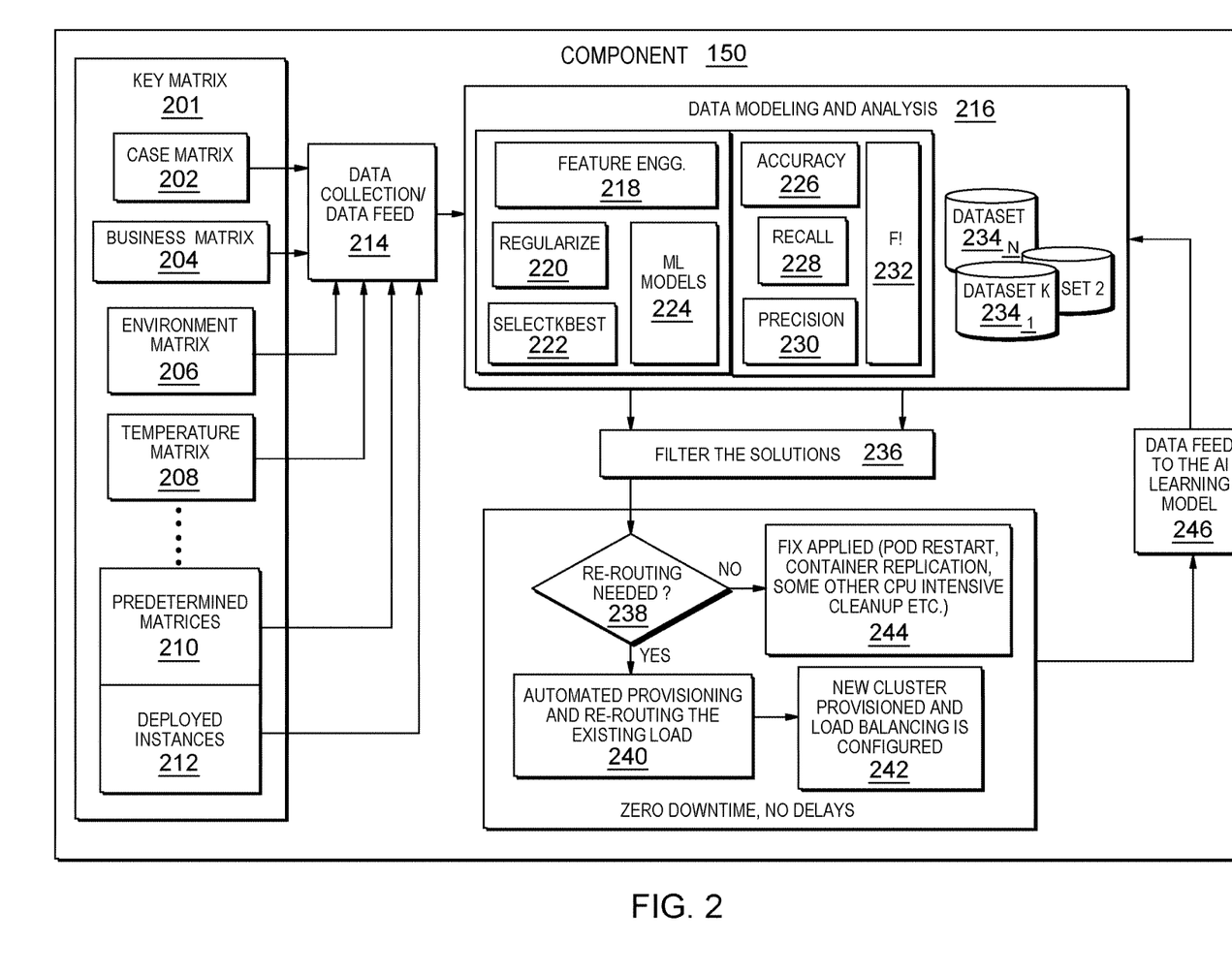
FIG. 2 illustrates a functional block diagram and operational steps of the multi-cloud environment management program, on a server computer within the distributed data processing environment of FIGS. 1, in accordance with an embodiment of the present invention.

FIG. 2 illustrates a functional block diagram with operational steps of component 150, generally designated 200, in communication with client computer 101, remote server 104, private cloud 106, EUD 103, and/or public cloud 105, within distributed data processing environment 100, for managing resources in a multi-cloud environment, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In various embodiments, component 150 comprises key matrix 201 for depicting/identifying future needs for the deployed instances, wherein the deployed instances comprises, but are not limited to: Quota Available/Used, growth in number of users, more activity happening on the provisioned infra, scaling for more instances of an application or a database when load increases on the cluster, logs or the generated events, and/or monitoring the health of the deployed server/cluster. Key matrix 201 may be subdivided or fine grained into a plurality of matrices. For example, case matrix 202, business matrix 204, and/or environment matrix 206 or many other such matrices based on different factors like availability, temperature within a predetermined area (e.g., room), power failures etc. In the depicted embodiment, key matrix 201 comprises case matrix 202, business matrix 204, environment matrix 206, temperature matrix 208, any other predetermined matrices 210 that are known and understood in the art, and deployed instances 212. Deployed instances 212 may be deploy instances of component 150 or SaaS offerings and may comprise: history, logs storage, quotas, and/or reports. Case matrix 202 may be utilized for monitoring different aspects of a particular problem (e.g., fall or peak usage patterns, historical data, the parameters for enhancing the predictions, etc.).

Business matrix 204 may be utilized for business continuity and for processing received tasks with lesser delays, optimal use of resources, and time and cost, predictions and getting prepared for the problem beforehand without exceeding the current cost, and delays for the customer in the best of business. Environmental matrix 206 may be utilized to analyze the particular weather forecasts and/or weather patterns to determine if there is an expected breakdown or power failure in coming days and analyze the identified predicted issues and instructing or executing preventative or remedying actions such as backing up or re-routing the data and provisioned artefacts to the newly provisioned cluster in a safe zone. It is important to note that key matrix 201 is not limited to these matrices. Temperature matrix 208 refers to temperature in the datacenter in a region. For example, if the temperature is rising then the increase in temperature may result in failure of a datacenter. Predefined metrics include metrics that have been predefined to track in order to ensure optimal behavior of the infrastructure or SaaS offering. Other matrices may comprise CPU utilization or memory utilization.

Component 150 may be or may comprise an automated AI pipeline that collects data, predicts one or more system issues (i.e., identifies an event that will likely occur within or above a predetermined threshold), and processes and/or executes the predicted solution. In various embodiments, component 150 may automate a sequence of execution steps, wherein the sequence of execution steps comprise: data collection, re-routing system traffic, and processing/executing one or more predicted/identified solutions. In various embodiments, re-routing of system traffic, via an AI based system, is based on the considerations available from the different set of input matrices. In the depicted embodiment, component 150 collects data (i.e., data collection/data feed 214) from key matrix 201 (e.g., case matrix 202 business matrix 204, environment matrix 206, and predetermined matrices 210), wherein the collected data will be further divided into datasets based on various predetermined factors (e.g., cost efficiency, time efficiency, system need, success ratio, expected outcome, historical pattern, etc.) to hold the data for running machine learning (ML) and artificial intelligence (AI). For example, in the depicted embodiment, the collected data is divided and stored in various datasets represented by dataset K $234_1$ through dataset K $234_N$, herein, collectively referred to as dataset(s) 243. As used herein, N represents a positive integer, and accordingly the number of scenarios implemented in a given embodiment of the present invention is not limited to those depicted in FIG. 2.

Component 150, via data modeling and analysis 216, apply machine learning (ML) modeling techniques (e.g., feature engineering 218, regularize 220, and SelectKBest 222) to identify data (e.g., datasets) to be extracted. In various embodiments, the identified and/or extracted datasets are integrated for an analysis to predict (i.e., identify within a predetermined threshold) the likelihood of a problem and the solutions to the identified problems. In the depicted embodiment, classification models such as accuracy 226, precision 230, recall 228, and F1 are applied to optimize accuracy and generate accurate solutions. Accuracy 226 tells you how many times the ML model was correct overall. Precision 230 identifies the precise a model is at predicting a specific category. Recall 228 identifies how many times q model was able to detect a specific category. F1 balances both precision and recall. Accuracy 226, precision 230, recall 228, and F1 are data modelling techniques and used by ML to generate the optimal set of datasets which then can generate a list of solutions. In the depicted embodiment, component 150 filters the solution 236 generated by data modeling and analysis 216. Component 150 may utilize automated solutions generated from data modeling and analysis 216 (e.g., resulted datasets) to filter the generated solutions to identify optimal solutions. In the depicted embodiment, component 150 predicts one or more solutions for one or more identified problems and triggers events to implement/execute the one or more identified solutions.

Component 150 may determine if the triggered events need to be re-routed, wherein the re-routing mechanism determines where to re-route the request or an additional cluster or deployment is needed or not, wherein the request is the solution generated as the outcome by component 150 which can either be re-routed or is to provision additional resources/clusters. In the depicted embodiment, if component 150 identifies that the triggered events require re-routing (Yes step) then component 150 executes automated provisioning and re-routing 240; however, if component 150 identifies that the triggered events do not require re-routing (No step) then component 150 applies/implements the identified solution 244. Automated provisioning and re-routing 240 may comprise implementing automated provisioning and re-routing to the existing load. Applying/implementing the identified solution 244 comprises executing one or more identified solutions proactively to prevent the one or more identified issues (e.g., executing a pod restart, container replication, a CPU intensive cleanup, and/or any other solution known and understood in the art).

Component 150 may prepare the system or issue an alert or instructions to the system notifying the system to prepare itself to process the curated set of automated instruction and to process the predicted solution. During processing, component 150 may determine a time window (generally when the environment is not in use or resource utilization is low), when the processing the predicted results will not hamper the current environment usage and prevent delays and downtime for existing users. Component 150 may proactively identify and implement solutions to predicted issues (e.g., deploying more database instances, increasing the storage quota for that user, reusing unused instances, etc.).

For example, there is a major holiday sale at all the national retail stores, during this time, the shopping sites for said retail stores who are offering discounts are flooded with users which results in the sites managing almost double the logins and accounts, authentications, buckets of orders, loads of data and many more challenges to provide the same smooth customer experience. To overcome these challenges, component 150 continuously monitors and assesses the amount of resources usage/consumption, capacity, availability etc. for a predetermined amount of time (e.g., 2-3 days) prior to any predetermined event (e.g., major holiday sale), wherein component 150 predicts, after considering different business challenges (key matrix), solutions to successfully manage the large influx of users. In this case, the proposed AI based algorithm will provision the cluster or resources (mongoDB) 2-3 days prior when its actually needed (custom time window) and will reroute the traffic and load to that cluster.

In another example, the AI based rerouting of component 150 considers various factors, in addition to the state of the cluster, such as environmental factors (temperature drops and/or weather forecasts) which might affect the system (e.g., breakdowns or power outages), and business challenges and cluster changes (Business matrix and Case matrix). Thus, in the event of a sudden power failure all the datacenters and transactions may be down for several days (e.g., two days). In this example, the data being input from the forecast is analyzed/processed to generate and output one or more predictions to the system, wherein component 150 identifies that there is a need of re-routing the workload to a backup cluster (in SaaS world where we have multi cloud environments or the HA environments) or setting up a new cluster in a safe region (other US region) before the actual disaster happens. Therefore, in this example, component 150 reroutes the workload to that cluster instead of rerouting after the disaster actually happened. Thus, the AI based rerouting on the basis of identified future needs, executed by component 150, results in cost efficiency.

Figure 3:
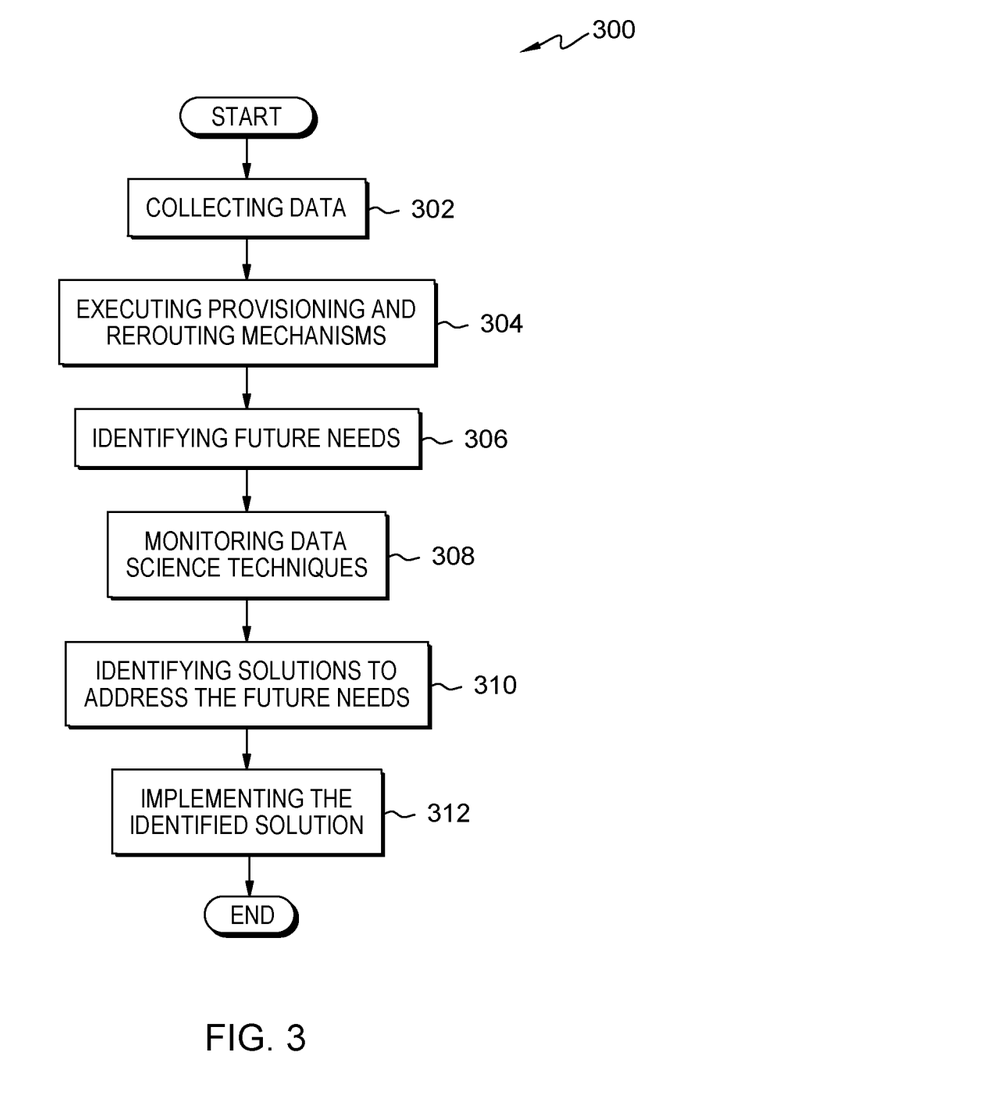
FIG. 3 illustrates operational steps of the multi-cloud environment management program, on a server computer within the distributed data processing environment of FIGS. 1, in accordance with an embodiment of the present invention.

FIG. 3 illustrates operational steps of component 150, generally designated 300, in communication with client computer 101, remote server 104, private cloud 106, EUD 103, and/or public cloud 105, within distributed data processing environment 100, for identifying which process to execute to improve compilation time based on historical metadata, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 150 collects data. Component 150 may collect data, via AI and ML techniques, to make the data more concrete to get the correct or near to correct predictions, wherein correct or near correct predictions are based on a predetermined threshold or range. In various embodiments, component 150 comprises an automated AI pipeline that collects data, predicts one or more system issues (i.e., identifies an event that will likely occur within or above a predetermined threshold), and processes and/or executes the predicted solution.

In step 304, component 150 executes provisioning and rerouting mechanisms. In various embodiments, component 150 executes an AI based provisioning and rerouting mechanisms to address business continuity in event of changes in business, environment, weather, compute, infrastructure, security breaches and other key factors. In various embodiments, component 150 executes provisioning and rerouting mechanisms to maintain continuity in the multi-cloud computing environment despite changes to one or more predetermined factors or an identified problem, wherein executing provisioning and rerouting comprises re-routing a provisioned artefact and the collected data to a newly provisioned cluster in a safe zone.

In step 306, component 150 identifies future needs of the system. In various embodiments, component 150 predicts the future needs of the system based on the collected data (e.g., data, history, logs, continuous monitoring key metrics, feeds, history, and other data collection techniques) and executed provision and rerouting mechanisms. In various embodiments, component 150 utilizes an artificial intelligence (AI) infused algorithm to monitor and analyze use history and data science techniques to identify and select an optimized path to predict service failures and apply auto correction. In various embodiments, component 150 integrates the identified and/or extracted datasets into the analysis to predict (i.e., identify within a predetermined threshold) the likelihood of a problem.

In step 308, component 150 monitors data science techniques. In various embodiments, component 150, via an AI infused algorithm, monitors, and analyzes the use history and/or one or more data science techniques.

In step 310, component 150 identifies solutions to address the future needs of the system. In various embodiments, component 150 generates a list of identified solutions to prevent or remedy the identified future needs of the system (i.e., potential issues), wherein the identified list is a weighted list that prioritizes the solutions based on a predetermined measurement or weight. The generated list of identified solutions may be displayed to a user, wherein the generated list of identified solutions is displayed as a responsive prompt. Component 150 may identify and select an optimize route to implement the identified solutions. In various embodiments, the solutions are identified as the outcome of the machine learning model. In various embodiments, component 150 identifies one or more solutions based on a combination of ML, AI, and user feedback loop, wherein the user feedback loop may be on acceptable solutions suggested by ML and AI.

In step 312, component 150 implements the identified solutions. In various embodiments component 150 proactively and autonomously implements the identified solutions based on the generated list, the select optimized route, and/or predetermined criteria. In some embodiments, component 150 proactively implements the identified solutions based on a user's response register by the responsive prompt. Component 150 may apply one or more identified solutions by using re-routing or via provisional infrastructural components.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented for managing resources in a multi-cloud computing environment, the computer-implemented method comprising:
   executing provisioning and rerouting mechanisms to maintain continuity in the multi-cloud computing environment despite changes to one or more predetermined factors or an identified problem;
   predicting a future need of a system based on collected data and the executed provision and rerouting mechanisms;
   analyzing use history within the multi-cloud computing environment;
   identifying one or more solutions to address the future needs of the system based on the analysis of the use history; and
   proactively and autonomously implementing the one or more identified solutions based one or more predetermined criteria in the multi-cloud computing environment.

2. The computer-implemented method of claim 1, further comprising:
   generating a list of identified solutions to prevent or remedy the identified future needs of the system, wherein the identified list is a weighted list that prioritizes the one or more identified solutions based on a predetermined measurement or weight.

3. The computer-implemented method of claim 2, further comprising:
   displaying the generated list of identified solutions to a user, wherein the generated list of identified solutions is displayed as a responsive prompt.

4. The computer-implemented method of claim 1, further comprising:
   identifying an optimize route to implement the identified solutions; and
   selecting the optimize route to implement in the system.

5. The computer-implemented method of claim 1, further comprising:
   re-routing a provisioned artefact and the collected data to a newly provisioned cluster in a safe zone.

6. The computer-implemented method of claim 1, wherein predicting the future need of the system further comprises:
   deploying additional resources on environments proactively to fulfil the identified future needs.

7. The computer-implemented method of claim 1, further comprising:
   automating rerouting of traffic based on machine learning artificial intelligence (AI) with data from predetermined sources, wherein the predetermined sources comprise: system traffic, compute, environment, weather, and security; and
   auto-provisioning components of a SaaS based on the machine learning AI and the data from the predetermined sources.

8. A computer system for managing resources in a multi-cloud computing environment, the computer system comprising:
   one or more computer processors;
   one or more computer readable storage devices; and
   program instructions stored on the one or more computer readable storage devices for execution by at least one of the one or more computer processors, the stored program instructions comprising:
      program instructions to execute provisioning and rerouting mechanisms to maintain continuity in the multi-cloud computing environment despite changes to one or more predetermined factors or an identified problem;
      program instructions to predict a future need of a system based on collected data and the executed provision and rerouting mechanisms;
      program instructions to analyze use history within the multi-cloud computing environment;
      program instructions to identify one or more solutions to address the future needs of the system based on the analysis of the use history; and
      program instructions to proactively and autonomously implement the one or more identified solutions based one or more predetermined criteria in the multi-cloud computing environment.

9. The computer system of claim 8, further comprising:
   program instructions to generate a list of identified solutions to prevent or remedy the identified future needs of the system, wherein the identified list is a weighted list that prioritizes the one or more identified solutions based on a predetermined measurement or weight.

10. The computer system of claim 9, further comprising:
    program instructions to display the generated list of identified solutions to a user, wherein the generated list of identified solutions is displayed as a responsive prompt.

11. The computer system of claim 8, further comprising:
    program instructions to identify an optimize route to implement the identified solutions; and
    program instructions to select the optimize route to implement in the system.

12. The computer system of claim 8, further comprising:
    program instructions to re-route a provisioned artefact and the collected data to a newly provisioned cluster in a safe zone.

13. The computer system of claim 8, wherein the program instructions to predict the future need of the system further comprises:
    program instructions to deploy additional resources on environments proactively to fulfil the identified future needs.

14. The computer system of claim 8, further comprising:
    program instructions to automate a rerouting of traffic based on machine learning artificial intelligence (AI) with data from predetermined sources, wherein the predetermined sources comprise: system traffic, compute, environment, weather, and security; and
    program instructions to auto-provision components of an on-demand software based on the machine learning AI and the data from the predetermined sources.

15. A computer program product for managing resources in a multi-cloud computing environment, the computer program product comprising:
    one or more computer readable storage devices and program instructions stored on the one or more computer readable storage devices, the stored program instructions comprising:
       program instructions to execute provisioning and rerouting mechanisms to maintain continuity in the multi-cloud computing environment despite changes to one or more predetermined factors or an identified problem;

program instructions to predict a future need of a system based on collected data and the executed provision and rerouting mechanisms;

program instructions to analyze use history within the multi-cloud computing environment;

program instructions to identify one or more solutions to address the future needs of the system based on the analysis of use history; and program instructions to proactively and autonomously implement the one or more identified solutions based one or more predetermined criteria in the multi-cloud computing environment.

16. The computer program product of claim 15, further comprising:

program instructions to generate a list of identified solutions to prevent or remedy the identified future needs of the system, wherein the identified list is a weighted list that prioritizes the one or more identified solutions based on a predetermined measurement or weight; and program instructions to display the generated list of identified solutions to a user, wherein the generated list of identified solutions is displayed as a responsive prompt.

17. The computer program product of claim 15, further comprising:

program instructions to identify an optimize route to implement the identified solutions; and program instructions to select the optimize route to implement in the system.

18. The computer program product of claim 15, further comprising:

program instructions to provision one or more resources, based on the analysis, for a predetermined time prior to the implementation so as to address one or more forthcoming challenges associated with the future need of the system.

19. The computer program product of claim 15, wherein the program instructions to predict the future need of the system further comprises:

program instructions to deploy additional resources on environments proactively to fulfil the identified future needs.

20. The computer program product of claim 15, further comprising:

program instructions to automate a rerouting of traffic based on machine learning artificial intelligence (AI) with data from predetermined sources, wherein the predetermined sources comprise: system traffic, compute, environment, weather, and security; and program instructions to auto-provision components of an on-demand software based on the machine learning AI and the data from the predetermined sources.

* * * * *